United States Patent [19]
Desmarteau

[11] Patent Number: 5,463,005
[45] Date of Patent: Oct. 31, 1995

[54] COPOLYMERS OF TETRAFLUOROETHYLENE AND PERFLUORINATED SULFONYL MONOMERS AND MEMBRANES MADE THEREFROM

[75] Inventor: Darryl D. Desmarteau, Clemson, S.C.

[73] Assignee: Gas Research Institute, Chicago, Ill.

[21] Appl. No.: 105,109

[22] Filed: Aug. 11, 1993

Related U.S. Application Data

[63] Continuation of Ser. No. 829,878, Jan. 3, 1992, abandoned.

[51] Int. Cl.[6] .................................................. C08F 228/02
[52] U.S. Cl. ..................... 526/240; 210/500.42; 526/243
[58] Field of Search ..................... 526/243, 240, 526/241

[56] References Cited

U.S. PATENT DOCUMENTS

| | | | |
|---|---|---|---|
| 3,050,556 | 8/1962 | Tiers . | |
| 3,078,245 | 2/1963 | Heine | 526/243 |
| 3,301,893 | 1/1967 | Putnam et al. . | |
| 3,318,852 | 5/1967 | Dixon | 526/243 |
| 3,849,243 | 11/1974 | Grot . | |
| 3,902,947 | 9/1975 | Grot | 526/243 |
| 4,093,568 | 6/1978 | Seko | 526/243 |
| 4,337,211 | 6/1982 | Ezzell et al. | 560/150 |
| 4,474,700 | 10/1984 | Krespan | 562/586 |
| 4,554,112 | 11/1985 | Ezzell et al. | 568/674 |
| 4,578,512 | 3/1986 | Ezzell et al. | 562/586 |
| 4,734,474 | 3/1988 | Hamada et al. | 526/243 |

FOREIGN PATENT DOCUMENTS

| | | |
|---|---|---|
| 0062324 | 2/1982 | European Pat. Off. . |
| 0062323 | 2/1982 | European Pat. Off. . |
| 1959142 | 11/1969 | Germany . |

*Primary Examiner*—Christopher Henderson
*Attorney, Agent, or Firm*—Dority & Manning

[57] ABSTRACT

Novel perfluorinated sulfonyl monomers and polymers and membranes made therefrom are provided. The fluorocarbon monomers have the general formula:

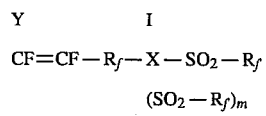

wherein X is CH or N, I is H, K, Na, or a Group I or II metal, $R_f$ is one or more fluorocarbon group, including fluorocarbon ethers and/or sulfonyl groups and/or perfluoro-non-oxy acid groups, $R_f$ is $C_nF_{2n+1}$ (n=0,1,2, . . .), Y is $C_nF_{2n+1}$ (n=0,1,2, . . .) and m is 0 or 1. The monomers are made from the non-oxy superacid groups

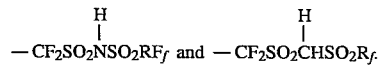

Copolymers of the above monomers with other monomeric material such as tetrafluoroethylene are also provided. These copolymers may then be cast into ionomer membranes and other structures for use in electrochemical processing.

12 Claims, No Drawings

COPOLYMERS OF TETRAFLUOROETHYLENE AND PERFLUORINATED SULFONYL MONOMERS AND MEMBRANES MADE THEREFROM

This is a continuation of application U.S. Ser. No. 07/829,878, filed Jan. 3, 1992, which was abandoned upon the filing hereof.

FIELD OF THE INVENTION

Novel perfluorinated sulfonyl monomers and polymers and membranes made therefrom are provided.

BACKGROUND OF THE INVENTION

Electrochemical processing involves the interaction of electrical and chemical reactions to produce a wide variety of products, separations, and processes. Included among the more significant industries that employ electrochemical processing are the plating industry, the chloro-soda industry, hydrogen-oxygen fuel cells, waste water treatments, and the plethora of industries employing electrochemical membranes, hollow fibers and tubes. Electrochemical processes are used to produce products such as aluminum, deuterium, fluorine, platinum, and sorbitol, to name only a few.

Electrochemical processes are used to convert chemical energy into electrical energy in electrolytic fuel cells, such as batteries. Electrolytic cells usually employ membranes that are permeable to one type of ion but impermeable to the other. Recently, DuPont has developed a perfluorosulfonic membrane known as "Nafion". Nafion membranes have the chemical and thermal stability of Teflon tetrafluoroethylene resins but are very hydrophilic. Unlike Teflon, which is one of the most hydrophobic substances known, Nafion absorbs water rapidly even at room temperature. Their high chemical stabilities and high water absorption rates have made Nafion membranes a unique, long-life separator in electrochemical and chemical processing.

Nafion is a polyperfluorosulfonic acid resin. Membranes made from Nafion resins were a revolutionary development in the field of electrochemistry. The resin and its membranes, especially the composite membrane of polyperfluorosulfonic acid and polyperfluorocarboxylic acid, have been broadly used in all industries where electrochemical membranes are employed.

In the 1950's, chemists began focussing on fluorocarbon polymers having extraordinary chemical stabilities and the mechanical and electrical properties of polytetrafluoroethylene (PTFE) but that were also melt-fabricable like the polyethylenes and polyamides. The rearrangement of hexafluoropropylene epoxide (HFPO) led to the production of perfluoropropionyl fluoride, which is then reacted with more HFPO to produce a dimer which, on heating with sodium carbonate, yields perfluoropropyl vinyl ether (PPVE). PPVE has been copolymerized with tetrafluoroethylene (TFE) to provide a thermoplastic with the chemical stability and mechanical properties closely approaching those of PTFE.

Chemists then discovered the remarkable properties of an ionomer resin which was an acid salt of an ethylene and methacrylic acid copolymer. These ionomers were sold under the trademark "SURLYN". Researchers also began to search for fluorocarbon resin ionomers having acid groups with greater thermal stability than carboxyls in order to find ionomers capable of withstanding the high processing temperatures required for fabricating fluorocarbon plastics.

Then, in the late 1970's, a Bronsted acid of nitrogen was synthesized for the purpose of extending the number of possibilities of xenon-nitrogen bonds. From that research, a class of superacids with considerable promise in electrochemical applications emerged. The superacid developed was a perfluorinated sulfonyl nitrogen acid having the formula $(CF_3SO_2)_2NH$.

$(CF_3SO_2)_2NH$ is more than two orders of magnitude stronger in acidity than nitric acid in acetic acid solvent (dissociation constant of 10.2 vs.7.8). The phase acidity of these compounds show that they far exceed the inherent acidity of other acids such as $CF_3SO_2OH$, $FSO_3H$, and HI.

Electrochemical studies have shown that these acids exhibit favorable properties on low surface area and high surface area electrodes employed in practical fuel cells. The compounds greatly improve the output of the typical fuel cell. Electrolytes and fuel cells employing these materials dictate that the fluoropolymers be extremely stable. Presently, Nafion and Dow 560 are the current ionomers of choice in fuel cell applications.

To produce a Nafion polymer, a cyclic sultone is rearranged to a linear form and reacted with HFPO to produce a sulfonyl fluoride, which is then reacted with sodium carbonate to yield a sulfonyl fluoride vinyl ether (PFSEPVE). PFSEPVE is then polymerized with TFE to give a perfluorocarbon sulfonyl fluoride copolymer that can be fabricated into a membrane and other various articles. This polymer has the chemical formula:

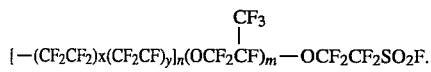

The sulfonyl copolymer can be completely saponified with hot caustic to give a sodium salt which can then be converted with an acid to an acid polymer resin form. The salt and free acid forms of the polymer resin are essentially infusible.

Nafion polymers may be fabricated into various forms, including membranes, diaphragms, tubing, laminates, and filaments. These products are shaped as desired by melt fabricating the sulfonyl fluoride copolymer, followed by saponifying and exchanging. In this manner, the Nafion products can be made free of pin holes, which is a necessity for membrane processes.

Nafion membranes have been used in electrolytic fuel cells, electrodialysis processes, including dialysis of brackish water and electrolysis of brine, chrome plating, and other applications. In electrochemical cells, Nafion membranes separate the cell into two compartments and serve as a wettable, ionically conductive, perm selective barrier. In dialysis, Nafion membranes serve as a wettable, perm selective reactor.

Nafion membranes are permeable to positively charged ions (cations) but are impermeable to negatively charged ions (anions). By tailoring the polymer structure and employing special techniques for fabricating and reinforcing the membrane, Nafion membranes combine good selectivity with low resistance, high physical strength and long service life.

The membrane processes employing Nafion membranes are advantageous from an energy standpoint over evaporative and crystallization processes. Processes using these membranes allow separation of dissolved materials from one another or from a solvent with no phase change. Membrane processes do not require the added energy required for vaporization or crystallization. Because energy costs represent a substantial and increasing percentage of the total cost for most separation operations, membrane processes offer significant energy savings. In addition, electrochemical membrane processes offer possible solutions to ecological problems, particularly in the plating industry. Potential pollutants in the plating industry are converted into valuable products by electropurifying and electrooxidzing a process stream to make the stream constituents suitable for reuse.

Nafion membranes, however, suffer from the inability to retain sufficient water to maintain proton conductivity above 80° C. New monomers which form superior polymeric membranes and offer greater flexibility in the design of membranes are currently being sought.

The present invention, which incorporates the

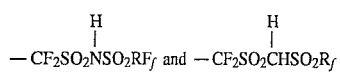

acid groups into a perfluorocarhon polymer, can be used to create new and novel polyfluorocarhon electrolytes for improved use in fuel cells and other applications.

Various fluorocarbon compositions having sulfonyl groupings are known in the art. For example, U.S. Pat. No. 3,050,556 to Tiers relates to a mono-chloro-substituted long chain alkanesulfonyl fluoride having the general formula $Cl(CHR-CH_2)_nSO_2F$ where R is an alkyl radical of from 6 to 16 carbons and n is an integer of from 1 to 2. U.S. Pat. No. 3,301,893 to Putnam et al. also relates to various fluorocarhon ethers having the general formula:

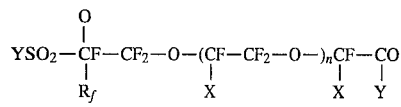

where $R_f$ is a radical selected from fluorine and perfluoroalkyl radicals having from 1 to 10 carbons, X is a radical selected from fluorine, trifluoromethyl radicals and mixtures thereof, Y is a radical selected from fluorine, amino, hydroxyl and —OMe radicals where Me is a radical selected from ammonium radicals, alkali metals and other monovalent metals, and where n represents a number from 0 to 12. U.S. Pat. No. 3,849,243 to Grot relates to laminates of fluorinated polymers containing pendant side chains having sulfonyl groups where a majority of the sulfonyl group of one surface is in the —$(SO_2NH)_mQ$ form where Q is H, a cation of an alkali metal, or a cation of an alkaline earth metal or combination thereof, and m is the valance of Q, while the sulfonyl groups of the other surface are in the —$SO_2M$ form wherein M is a halogen atom. One monomer used in making the polymers of the invention disclosed therein has the generic formula $CF_2=CFR_fSO_2F$ wherein $R_f$ is a bifunctional perfluorinated radical comprising 1 to 8 carbons.

Other patents and applications, such as U.S. Pat. Nos. 4,578,512 to Ezell et al., 4,337,211 to Ezell et al., 4,734,474 to Hamada et al., 4,554,112 to Ezell et al., 4,474,400 to Krespan, German Patent No. 1959142 to Abitz et al. and EPO Publication Nos. 0062323 of Darling and 0062324 of Krespan et al., show various perfluorinated monomer compounds and polymers resulting therefrom.

Although various perfluorinated monomers containing sulfonyl groups are known, the particular features of the present invention are absent from the art. The prior art is generally deficient in affording a non-oxy perfluorinated superacid monomer for producing an ionomer membrane having the characteristics and flexibility of the presently claimed invention. The present invention overcomes the shortcomings of the prior art in that the monomers disclosed herein and polymers made therefrom result in higher chemical stabilities and physical flexibilities than the Nafion polymers while providing all the desired characteristics of a Nafion polymer.

SUMMARY OF THE INVENTION

It is an object of the present invention to provide novel fluorinated monomers and polymers made therefrom.

It is another object of the present invention to provide novel fluorinated monomers containing sulfonyl groups and polymers made therefrom.

It is a further object of the present invention to provide novel fluorinated superacid monomers and polymers made therefrom.

It is further another object of the present invention to provide nitrogen acid monomers and polymers produced therefrom.

It is another object of the present invention to provide electrochemical membranes produced from ionomers of fluorinated polymers containing sulfonyl and nitrogen acid groups.

Still another object of the present invention is to provide fluorinated monomers and their corresponding derivative salts wherein the monomers have superacid characteristics and are capable of forming electrolytic membranes for use in fuel cells.

Generally speaking, the present invention is directed to novel perfluoronated superacid monomers containing sulfonyl groups and polymers produced therefrom. The polymers produced according to the present invention are useful as new polyelectrolytes applicable in fuel cell apparati and other applications that currently employ Nafion polymers.

Broadly speaking, the present invention is directed to fluorinated monomers having the general formula:

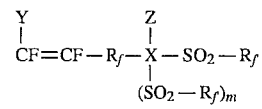

wherein X=CH or N

Z=H, K, Na, or Group I or II metal $R_f$=one or more fluorocarbon groups including fluorocarbon ethers and/or sulfonyl groups and/or perfluorononoxy acid groups $$R_f = C_nF_{2n+1} \ (n = 0, 1, 2, \ldots)$$
$$Y = C_nF_{2n+1} \ (n = 0, 1, 2, \ldots)$$
$$m = 0 \text{ or } 1$$

Examples of specific monomers that fall within the scope of the present invention include:

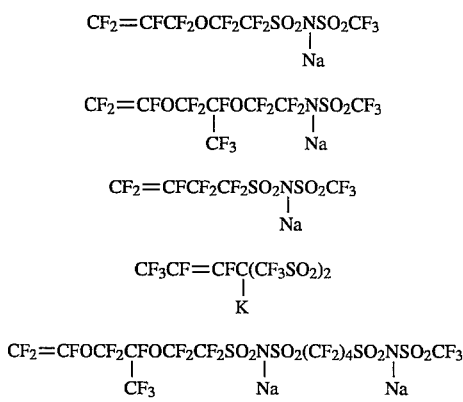

The monomers may be polymerized with other various monomers including tetrafluoroethylene (TFE) and tetraethylethylene (TEE), to provide copolymers useful for making various products, including electrolytic fuel cell membranes.

DESCRIPTION OF PREFERRED EMBODIMENTS

Novel fluorinated monomers which may be polymerized to form new polymers for use in various applications, including as solid polymer electrolytes electrochemical membranes, are provided. The polymers formed from the monomers described herein may be used to form chemically stable perfluorosulfonic membranes used in electrocells for electrochemical production of inorganics and organics. Polymers made from the inventive monomers can be used to replace Nafion and Dow 560 membranes currently being used as electrolytes in fuel cells and other applications. The inventive monomers have the general formula:

$$\begin{array}{c} Y \quad\quad Z \\ | \quad\quad | \\ CF=CF-R_f-X-SO_2-R_f \\ | \\ (SO_2-R_f)_m \end{array}$$

wherein X=CH or N

Z=H, K, Na, or Group I or II metal $R_f$=one or more fluorocarbon groups including fluorocarbon ethers and/or sulfonyl groups and/or perfluorononoxy acid groups $R_f = C_nF_{2n+1}$ (n = 0, 1, 2, . . .)
$Y = C_nF_{2n+1}$ (n = 0, 1, 2, . . .)
m = 0 or 1

Monomers having the above-referenced formula are superacids of carbon or nitrogen and may be synthesized through two basic synthetic routes, both employing perfluoroalkylsulfonyl fluorides. The parent member of the carbon superacid is $(CF_3SO_2)_2CH_2$ and the parent member for the nitrogen super acid is $(CF_3SO_2)_2NH$. The reaction routes for the nitrogen and carbon acid parent members are shown below.

Nitrogen:

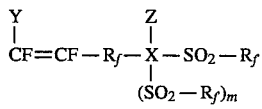

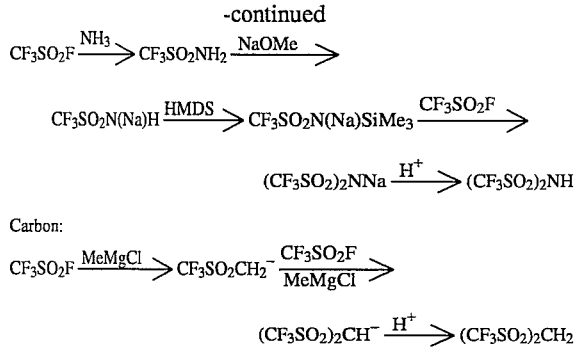

Carbon:

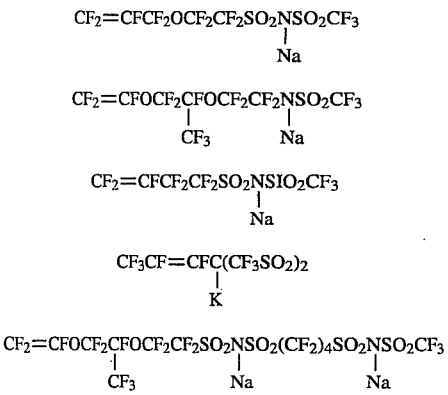

wherein Me is methyl and HMDS is hexamethyldisilazane.

Through the synthesis routes described herein, specific monomers of having the general formula above can be produced including the following:

$$CF_2=CFCF_2OCF_2CF_2SO_2NSO_2CF_3$$
$$|$$
$$Na$$

$$CF_2=CFOCF_2CFOCF_2CF_2SO_2NSO_2CF_3$$
$$| \quad\quad |$$
$$CF_3 \quad\quad Na$$

$$CF_2=CFCF_2CF_2SO_2NSIO_2CF_3$$
$$|$$
$$Na$$

$$CF_3CF=CFC(CF_3SO_2)_2$$
$$|$$
$$K$$

$$CF_2=CFOCF_2CFOCF_2CF_2SO_2NSO_2(CF_2)_4SO_2NSO_2CF_3$$
$$| \quad\quad\quad | \quad\quad\quad\quad\quad\quad |$$
$$CF_3 \quad\quad Na \quad\quad\quad\quad\quad\quad Na$$

It should be understood that the present invention is not limited to the specific monomers described herein, and that any monomer having the general formula described fall within the scope of the present invention. Synthesis routes of the five specific monomers identified above are merely exemplary so as to enable one of ordinary skill to make the superacid monomers of the present invention. Likewise, synthesis of the copolymers described hereinbelow are merely exemplary of the copolymers that come within the scope of this invention.

The present invention may be better understood by reference to the following examples. The process of producing each of the monomers in Examples 1–5 is described in terms of producing each progressing intermediate compound. Where appropriate, a reaction sequence is shown in diagram form to indicate the progression of intermediates to final monomer product.

EXAMPLE 1

Sodium N-trifluoromethylsulfonyl 2-[(1-pentafluoro-2-propenyloxy) tetrafluoroethylene] sulfonamide ($CF_2$=$CFCF_2OCF_2CF_2SO_2NHSO_2CF_3$) monomer having the general formula above, was produced according to the following method.

Perfluoroallyl fluorosulfate ($CF_2$=$CFCF_2OSO_2F$) was prepared according to the method of U.S. Pat. No. 4,235,804 to Krespan except that the molar ratio of perfluoropropene, sulfur trioxide and boron trifluoride used was 2.5:1:0.2 instead of 1.6:1:0.007. 24 g of sulfur trioxide, 4 g of boron trifluoride and 112 g of hexafluoropropene were vacuum-transferred into a 350-ml pressure reactor and agitated at 25° C. for 3 days. The mixture was then fractionated in high vacuum through-traps at −70° C. and −196° C.

Fluorosulfonyl difluoroacetyl fluoride was produced by modifying England's method disclosed in England, D. C., Dietrich, M. A. and Lindsey, R.V.J.Am.Chem.Soc., (1960), 82, 6181 (which is incorporated in full by reference thereto) as follows. 53 g of sulfur trioxide and 73 g of tetrafluoroethylene were transferred into a 350-ml pressure reactor. The mixture was then warmed to 80° C. and agitated for one week. The products were fractionated in high vacuum through traps cooled to −90, −110 and −196° C.

To produce 2-[(1-Pentafluoro-2-propenyloxy) tetrafluoroethylene] sulfonyl fluoride ($CF_2=CFCF_2O-CF_2CF_2SO_2F$), a suspension of 5.8 g of potassium fluoride in 100 ml of tetraglyme was stirred for 10 min at 25° C. 0.1 mole of fluorosulfonyl difluoroacetyl fluoride was then vacuum-transferred into the same flask and stirred at 25° C. for 30 minutes. 0.1 mole of perfluoroallyl fluorosulfate was then vacuum-transferred to the flask and stirred at 25° C. for 2 hours. The mixture was distilled in high vacuum through a trap at a −196° C. The product was then redistilled at 100 torr.

2-[(2,3-dichloropentafluoroproxyl) tetrafluoroethylene] sulfonyl fluoride ($CF_2ClCFClCF_2OCF_2CF_2SO_2F$) was produced by transferring 6 millimoles of chlorine into a 250-ml flask containing 1.65 g of 2-[(1-pentafluoro-2-pro-penyloxy) tetrafluoro ethylene] sulfonyl fluoride and stirring at 25° C. for 11 hours. The mixture was then fractionated at high vacuum through traps cooled to −70° C. and −196° C.

Sodium N-trifluoromethylsulfonyl 2-[(2,3-dichloro pentafluoropropoxy)-tetrafluoroethylene] sulfonamide ($CF_2ClCFClCF_2OCF_2CF_2SO_2NNaSO_2CF_3$) was produced by vacuum-transferring 5.4 g of 2-[(2,3-dichloropenta fluoropoxyl)tetrafluoro-ethylene] sulfonyl fluoride and 10 ml of acetonitrile into a 50-ml flask containing 3 g of $CF_3SO_2NNaSiMe_3$, and stirring at 75° C. under reflux for 2 days. The volatile materials were then removed under vacuum to give the sodium salt.

Finally, the salt form of the monomer of this example, sodium N-trifluoromethyl sulfonyl 2-[(1-penta-fluoro-2-propenyloxy) tetrafluoroethylene] sulfonamide ($CF_2=CFCF_2OCF_2CF_2SO_2NNaSO_2CF_3$), was produced by stirring a suspension of 9 g of activated zinc dust in 20 ml of pure acetic anhydride while 21.7 g of sodium N-trifluoromethylsulfonyl 2-[(2,3-dichloro pentafluoropropoxy) tetrafluoroethylene] sulfonamide was added under nitrogen atmosphere. The mixture was stirred at 80° C. under reflux for 3 hours and then filtered. The filtrate was then distilled in a high vacuum and the resulting solid product was dried under vacuum for several days.

N-trifluoromethylsulfonyl 2-[(1-pentafluoro-2-pro-penyloxy) tetrafluoroethylene] sulfonamide ($CF_2=CFCF_2OCF_2CF_2SO_2NHSO_2CF_3$) was produced by acidifying the monomer produced above. 16 ml of 60% sulfuric acid and 1.5 g of sodium N-trifluoromethylsulfonyl 2-[(1-pentafluoro-2-propenyl-oxy) tetrafluoroethylene] sulfonamide were added to a 50-ml flask. The mixture was stirred at 25° C. for one hour until it separated into two liquid phases. The bottom liquid layer was removed and distilled in high vacuum to obtain the acid form of the monomer.

The following represents the reaction diagram for producing sodium N-trifluoromethylsulfonyl 2-[(1-pentafluoro-2-propenyloxy) tetrafluoroethylene] sulfonamide ($CF_2=CFCF_2OCF_2CF_2SO_2NHSO_2CF_3$) monomer:

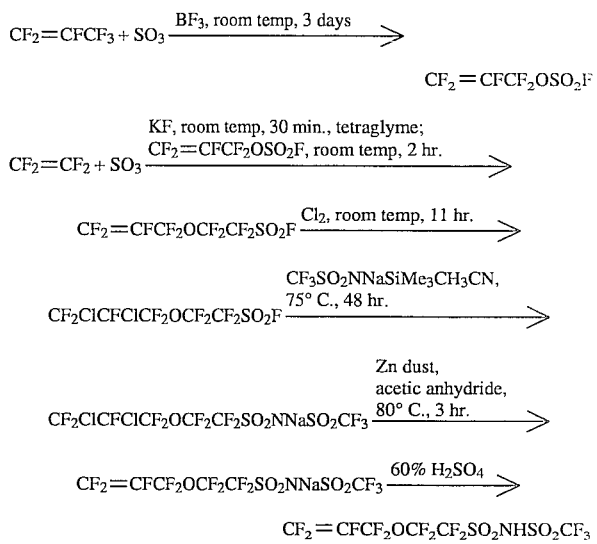

EXAMPLE 2

The monomer of this example, having the general formula above and the specific formula,

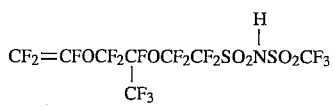

was prepared according to the following method.

Sulfur trioxide was melted in a 70° C. oil bath. After conversion to liquid, it was cooled to room temperature and then transferred into a 500-ml round bottom flask easily connectable to a vacuum line. The vessel was evacuated after cooling in liquid nitrogen. 61 g of $SO_3$ and 80 g of $C_2F_4$ were transferred by vacuum into a 200-ml stainless metal reactor at liquid nitrogen temperature. The reactor was shaken for 4 days at 40°–60° C. after which the products were transferred into a liquid nitrogen-cooled trap. The trap was opened and maintained at room temperature (protected with a $CaCl_2$ dry tube) to evaporate the dissolved $C_2F_4$ and other gaseous products.

The product formed above was purified by adding it to a 250-ml three-necked round bottom flask equipped with a dropping funnel, distillation condenser, receiver, reflux condenser and stir bar. The flask was cooled in an ice-water bath. 2-ml of dry triethylamine was dropped slowly from the dropping funnel into the flask to create a vigorous reaction, changing the colorless liquid to a red color. Stirring was continued at room temperature for 1 hour and purified

was distilled out.

15 g of CsF (fused powder) and 150 ml of tetraglyme (dried with sodium) were added into a 1000-ml round bottom vessel equipped with a Kontes Valve and stir bar. The vessel was attached to a vacuum line and cooled in liquid nitrogen. 120 g of

was transferred into the vessel through the vacuum line. The mixture was slowly returned to room temperature to avoid a vigorous thermopositive. The mixture was then stirred at room temperature for 1 hour and cooled in a $-10°$ C. to $-20°$ C. bath. 210 g of hexafluoropropylene oxide was continuously introduced into the vessel at between 750 and 400 torr and the mixture was vigorously stirred for 18 hours. The product was then distilled and two fractions were collected. The first fraction was pure n=0 and the second fraction was 14:66:16 mixture of n=0, 1, and 2, respectively. The second fraction obtained was

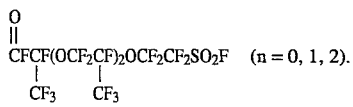

An apparatus for producing the pyrolytic decarboxylation of the carbonyl fluoride in fraction number 2 above was then constructed. 160 g of powdered sodium carbonate and 160 g of glass beads were mixed and packed into a column (50 cm long and 2.5 cm inner diameter). The fillings were supported by glass wool at the bottom of the column and covered with a glass wool on the top. A tape heater was tied tightly around the entire column. The pyrolysis temperature was measured by a thermocouple. A screw valve-controlled dropping funnel was fitted on top of the column through which a constant nitrogen flow (dried by $P_2O_5$) was introduced. At the bottom of the column, a two-necked receiver vessel was fitted and cooled in an ice-water bath. Another neck was protected with a condenser to prevent escape of the product. The column was preheated at 300° C. for 8 hours, and then maintained at 210° C. to 225° C. for pyrolysis.

The distillate (fraction number 2) prepared above was dropped slowly through the funnel into the column during 4 hours. The material was evaporated and brought through the column by nitrogen flow and pyrolized to obtain

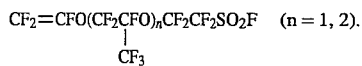

The double bond formed was then chlorinated. 48 g of vinyl ether was added to a 1000-ml round bottom reaction vessel equipped with glass-Teflon Kontes Valve and stir bar and containing the above pyrolized product. The vessel was attached to a vacuum line and cooled with liquid nitrogen. 100 bar (10.4 bar=1 mmol) of chlorine was introduced and condensed in the vessel. The Kontes Valve was closed and the reaction mixture was stirred at room temperature for 24 hours. Excess chlorine was removed by condensing it through the vacuum line into a trap. The chlorinated product,

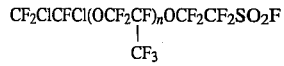

To produce the monomer and its precursors, 9 g of $CF_3SO_2N(Na)SiMe_3$ and 20 g of the chlorinated product produced above were stirred in a mixed solvent of 50 ml acetonitrile (dried with $CaH_2$ and $P_2O_5$) and 50 ml 1,4-dioxane (dried with sodium) under dry nitrogen at about 80° C. to 90° C. for 12 hours and then at 70° C. overnight. Solvents were removed at 70° C. under reduced pressure. The residue was dried at equivalent conditions for 8 hours.

100 ml of solid acetic anhydride and 20 g of zinc dust were added. The solution was stirred in a 80° C.–90° C. oil bath and under dry nitrogen for 12 hours and then at 70° C. overnight. Acetic anhydride was removed under vacuum at 60° C. 50 ml of 98% sulfuric acid was added. The solid slowly changed to a viscous liquid which was the crude monomer,

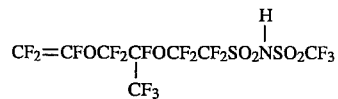

which was further purified by vacuum distillation.

The end product is a perfluorovinyl ether with a

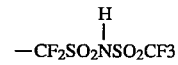

functional group. It is a stable monomer and can be stored at low temperatures for a long period of time. The results of copolymerization with TFE indicate that it is an active copolymerization monomer and provides

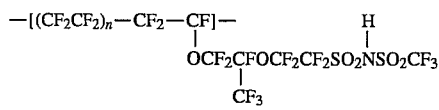

at equivalent weights as low as 1000 (n less than 6).

Unlike the Nafion resin, this novel perfluoro copolymer is soluble in dimethylformamide. It can be processed by casting to form the corresponding membrane.

The following represents the reaction diagram for producing the monomer of this example:

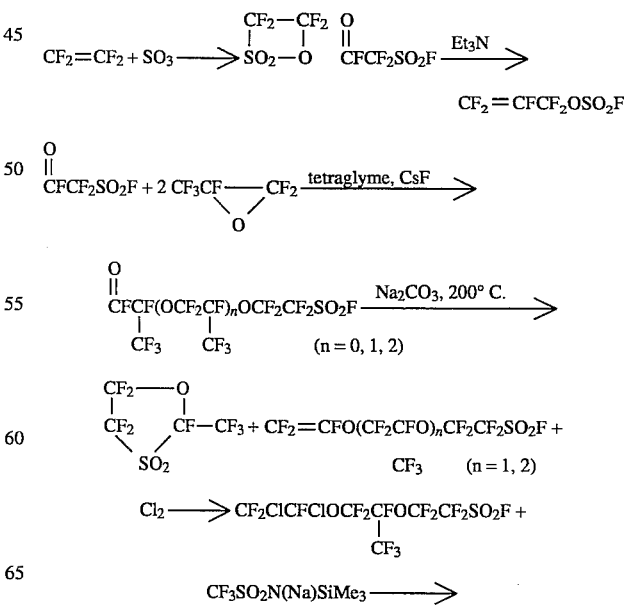

-continued $$CF_2=CFCF_2OCF_2CF_2SO_2NHSO_2CF_3$$

EXAMPLE 3

Two perfluoromonomers ($CF_2=CFCF_2CF_2SO_2F$ and $CF_2=CFCF_2SO_2N(H)SO_2CF_3$) containing the sulfonyl fluoride moiety and non-oxy superacid group were synthesized in high yield according to the method described in this example.

Sodium 3,4-Dichloro-perfluorobutane sulfinate ($ClCF_2CFClCF_2CF_2SO_2Na$) was prepared by stirring 100 g $Na_2S_2O_4$, 82 g $NaHCO_3$, 250 ml $H_2O$, and 150 ml $CH_3CN$ in a 1000-ml three-necked flask provided with a dropping funnel, an efficient reflux condenser and a magnetic stirrer. 100 g of 1,2-dichloro-4-iodo-perfluorobutane was added drop by drop through a 100-ml dropping funnel into the reaction mixture during one hour at 40° C. while stirring magnetically under nitrogen atmosphere. The mixture was stirred for 15 hours at 40° C., then distilled to remove $CH_3CN$ and extracted with 300 ml of ethyl acetate. The mixture was washed three times with 160 ml of sodium chloride-saturated water to remove all of the inorganic compounds. Ethyl acetate and water were evaporated under high vacuum to give dry solid product.

3,4-Dichloro-perfluorobutanesulfonyl chloride ($ClCF_2CFClCF_2CF_2SO_2Cl$) was prepared by placing 80 g of the sodium 3,4-Dichloroperfluorobutane sulfinate produced above (dissolved in 250 ml $H_2O$) in a 1000-ml three-necked flask provided with a magnetic stirrer, gas inlet tube and reflux condenser, the upper end of which was connected to a washing bottle filled with concentrated NaOH/water solution. Chlorine gas was bubbled through the solution, with occasional ice-water bath cooling, for 30 minutes. The product was washed with an aqueous solution of $NaHCO_3$, and dried over molecule sieves. Distillation at normal pressure yielded the liquid product.

3,4-Dichloro-perfluorobutanesulfonyl fluoride ($ClCF_2CFClCF_2CF_2SO_2F$) was then produced by one of two methods. In the first, a 1000-ml three-necked flask, provided with a magnetic stirrer, a reflux condenser, the upper end of which was connected to a drying tube, was filled with 250 ml dry cyclic sulfolane, 100 g activated potassium fluoride, and 100 g of 3,4-Dichloro-perfluorobutanesulfonyl chloride produced above. The product was distilled under high vacuum and cooled in a liquid nitrogen trap. Distillation under normal pressure yielded liquid product.

In the second method for producing 3,4-Dichloro-perfluorobutanesulfonylfluoride ($ClCF_2CFClCF_2CF_2SO_2F$), a three-necked flask provided with magnetic stirrer, a reflux condenser, the upper end of which was connected to a drying tube, was filled with 150 ml of very dry $CH_3CN$, 11.6 g activated potassium fluoride and 14.8 g of distilled 3,4-dichloro-perfluorobutanesulfonyl chloride produced above. The reaction mixture was stirred under a dry nitrogen atmosphere at room temperature for three days. The product was distilled to yield the product. Finally, the sulfonyl fluoride monomer, perfluoro-butene-3-sulfonyl fluoride ($CF_2=CFCF_2CF_2SO_2F$) was prepared by adding 200 ml dry 1,4-dioxane, 25 g of zinc powder and 23 g of the 3,4-dichloroperfluoro-butane sulfonyl fluoride produced above into a 500-ml three-necked flask, fitted with a magnetic stirrer and a reflux condenser, the upper end of which was connected to a trap cooled to –70° C. The reaction mixture was heated and stirred at 90° C. under nitrogen atmosphere for 10 hours. The product was distilled under vacuum and trapped in cooled liquid nitrogen. The crude product was washed by water to remove 1,4-dioxane, separated from water, dried over molecule sieves, and distilled to yield the intermediate.

Sodium perfluoromethylsulfonyl perfluoro-3,4-dichlorobutanesulfonyl imide intermediate ($ClCF_2CFClCF_2CF_2SO_2N(Na)SO_2CF_3$) for producing the non-oxy superacid of this example was prepared as follows. First, $CF_3SO_2NNa(SiMe_3)$, was prepared according to the method described in J. Foropoulos, Jr., D. D. DesMarteau, InorganicChemistry (1984) 23, 3720, which is incorporated in full by reference. Next, 100 ml of very dry $CH_3CN$, 21 g of $CF_3SO_2$-NNa$(SiMe_3)$ and 29 g of 3,4-dichloroperfluorobutane sulfonyl fluoride prepared as described above were placed in a 500-ml three-necked flask fitted with a magnetic stirrer and reflux condenser, the upper end of which was connected to a drying tube. The reaction mixture was heated at 80° C. with magnetic stirring for 4 days. The solvents and $FSiMe_3$ evaporated under high vacuum and the product was recrystallized in a small volume of water.

Perfluoromethylsulfonyl perfluoro-3,4-dichlorobutenesulfonyl imide ($CLCF_2CFClCF_2CF_2SO_2N(H)SO_2CF_3$) was prepared as follows. 0.5g of the sodium perfluoromethyl sulfonyl perfluoro-3,4-dichlorobutane sulfonyl imide prepared above was dissolved in 4 ml $H_2SO_4$ (98%) and sublimed at 120° C. and high vacuum to yield the liquid product.

The sodium salt of the acid monomer, sodium perfluoromethyl sulfonyl perfluorobutene-3-sulfonyl imide ($CF_2=CFCF_2CF_2SO_2N(Na)SO_2CF_3$) was then produced. 40 g of the sodium perfluoromethyl sulfonyl perfluoro-3,4-dichlorobutane sulfonyl imide, 150-ml of absolute ethanol, and 15 g of zinc powder were placed in a 500-ml three-necked flask, fitted with a reflux condenser and a magnetic stirrer. With magnetic stirring, the reaction mixture was heated at 80° C. under nitrogen atmosphere for 2.5 hours. The mixture was filtered to remove excess zinc and evaporated under high vacuum to yield solid product.

The salt form of the monomer was then converted into its acid form, perfluoromethylsulfonyl perfluoro-butene-3-sulfonyl imide ($CF_2=CFCF_2CF_2SO_2NHSO_2CF_3$). 37 g of sodium perfluoromethyl sulfonyl perfluorobutene-3-sulfonyl imide was dissolved in 70 ml of concentrated HCl (36%). NaCl deposits were removed by filtration. The layers were separated by distillation under reduced pressure, yielding the acid form of the monomer of this example.

The reaction mechanisms for the preparation of the specific monomers of this example are as follows:

$$CF_2=CFCl + ICl \longrightarrow ClCF_2CFClI$$

$$CF_2=CFCF_2OSO_2F$$

-continued

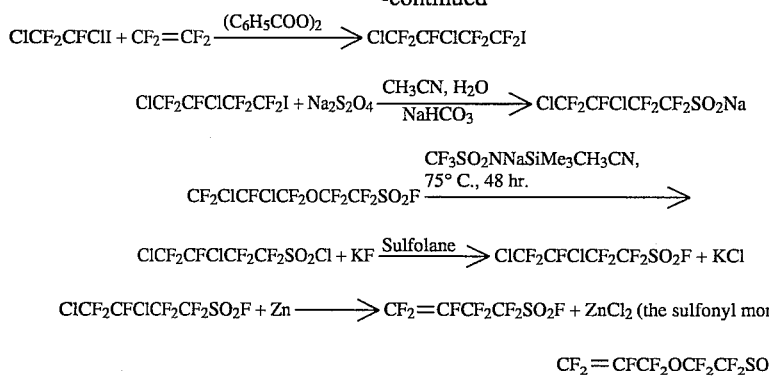

$$CF_2=CFCF_2OCF_2CF_2SO_2NHSO_2CF_3$$

EXAMPLE 4

Bis[(trifluoromethyl) sulfonyl]-3-propenylmethane potassium salt $(CF_3SO_2)_2C(K)CH_2CH=CH_2)$ was prepared according to the procedure described hereinbelow. To initially produce bis[(trifluoromethyl) sulfonyl] methane potassium salt $((CF_3SO_2)_2CHK)$, 11.2 g of bis[(trifluoromethyl)] methane $(CF_3SO_2)_2CH_2)$ was combined with 100 ml of acetone and 6.9 g of potassium carbonate in a 250-ml flask. The mixture was stirred under reflux for 4 hours and filtered. After filtration of the hot mixture, the filtrate was distilled under reduced pressure and the product was dried at 100° C. in high vacuum for one day.

Next, bis[(trifluoromethyl)sulfonyl]methane potassium magnesium chloride salt $((CF_2SO_2)_2CLMgCl)$ was prepared by adding 20 ml of dry THF and 9 g of the bis[(trifluoromethyl)sulfonyl]methane potassium salt prepared above to a 100-ml two-necked flask. After the mixture turned clear, 11.5 ml of 3M MeMgCl was gradually added to the mixture at 20° C. After methane production ceased, the reaction was allowed to run in a closed system for one day. The product was not isolated from THF but was used directly for further reaction.

Perfluoroallyl fluorosulfate $(CF_2=CFCF_2OSO_2F)$ was then produced by adding 24 g of sulfur trioxide, 4 g of boron trifluoride and 112 g of hexafluoropropylene to a 310-ml stainless-steel pressure reactor by vacuum line. The pressure reactor was warmed to 20° C. and shaken for 3 days. The reaction mixture was fractionated through traps of −70° and −196° C. in high vacuum and the product was trapped in the −70° C. trap.

Perfluoroallyl iodide $(CF_2CFCF_2I)$ was prepared by transferring 8.5 g of dry potassium iodide, 20 ml of tetraglyme and 42.5 millimoles of perfluoroallyl fluorosulfate by vacuum line to a 100-ml flask. The mixture was warmed to 20° C. and stirred for 12 hours in a dark room. The mixture was then fractionated through −100° C. and −196° C. traps, with the product being collected in the −100° C. trap.

Bis[(trifluoromethyl)sulfonyl]-t-1-perfluoro propenyl methane potassium salt was prepared by transferring 28.3 millimoles of the bis[(trifluoromethyl) sulfonyl]methane potassium magnesium chloride prepared above, 30 ml of THF and 8.5 g of the perfluoroallyl iodide prepared above by vacuum line to a 100-ml flask. The mixture was warmed to 20° C. and stirred for 3 days in a dark room. The mixture was filtered and distilled. The residue was dissolved into water and the present intermediate was extracted with ethyl ether from the aqueous solution several times. The ethyl ether solution was collected, dried with $CaCl_2$ and distilled.

Next, 4,4-bis[(trifluoromethyl)sulfonyl]-1-butene was prepared by adding 3 ml of allyl bromide to 31.3 millimoles of the bis[(trifluoromethyl)sulfonyl] methane potassium magnesium chloride in 35 ml of THF. The mixture was stirred at 70° C. under reflux for 8 hours. After removal of solvent by distillation under reduced pressure, 50 ml of 3N hydrochloric acid was added to the residue and the aqueous solution was extracted with ethyl ether. The ethyl ether solution was dried with anhydrous $MgSO_4$. The ethyl ether was removed from the solution and the product was distilled at 0.02 torr.

Finally, the monomer of the present example (bis[(trifluoromethyl)sulfonyl]-3-propenylmethane potassium salt) was produced by stirring a solution of 9 g of 4,4-bis [(trifluoromethyl)sulfonyl]-1-butene in 60 ml of acetone and adding 4.6 g of potassium carbonate. The mixture was stirred at 60° C. under reflux for 4 hours, then filtered and distilled. The residue was dried at 100° C. in high vacuum for one day to yield the monomer product.

EXAMPLE 5

The monomer of this example, $$\begin{array}{ccc} CF_2=CFOCF_2CFOCF_2CF_2SO_2NSO_2(CF_2)_4SO_2NSO_2CF_3 \\ | & | & | \\ CF_3 & H & H \end{array}$$

was prepared according to the method described hereinbelow. Initially, $CF_3SO_2NNaSO_2CF_2CF_2CF_2SO_2F$ was produced by transferring, in a dry box, 23.4 g of $CF_2SO_2NNaSiMe_3$ to a 500-ml one-necked flask with a stir bar. 70g of $FSO_2(CF_2)_4SO_2F$ and 300 ml of acetonitrile were added to the flask under nitrogen atmosphere. The mixture was stirred with reflux at 85° C. under nitrogen atmosphere for 2 days. Acetonitrile and unreacted $(FSO_2CF_2CF_2)_2$ were removed by high vacuum evaporation and the residue was dried under high vacuum at 80° C. for 12 hours to give an intermediate product.

$CF_3SO_2NNaSO_2CF_2CF_2CF_2CF_2SO_2NHNa$ was prepared next. A 500-ml three-necked flask was fitted with a nitrogen and $NH_3$ gas inlet, mechanical stir rod, and gas outlet connected to a oil trap. The flask was cooled to −196° C. and nitrogen gas was passed through the flask until 200 ml of liquid $NH_3$ had been added. 44 g of dry 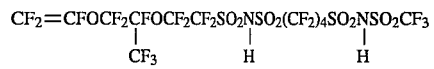 was added to the flask under nitrogen atmosphere. The temperature of the mixture was raised to −70° C. and the mixture was stirred under nitrogen atmosphere for 2 hours. The temperature of the mixture was raised to 20° C. and nitrogen gas was passed through the flask to remove $NH_3$ gas. 9.2 g of sodium methoxide and 200 ml of methanol were added to the flask and the mixture was stirred at 50° C. for one day. After filtration, methanol was removed from the filtrate by rotary evaporation. The residue was dried under high vacuum at 80° C. for one day to yield the intermediate product.

Next, $CF_3SO_2NNaSO_2CF_2CF_2CF_2CF_2SO_2NNaSiMe_3$ was prepared by transferring 40 g of the $CF_3SO_2NNaSO_2(CF_2)_4SO_2NHNa$ to 500-ml one-neck flask containing a stir bar. 200 ml of HMDS (hexamethyldisilazane) and 150 ml of acetonitrile were added to the flask and the mixture was stirred under reflux at 110° C. under nitrogen atmosphere for one day. Acetonitrile and HMDS were removed by high vacuum distillation. The residue was dried under high vacuum at 80° C. for one day to obtain the product.

To obtain the chlorinated product, $CF_2ClCFClOCF_2CF(CF_3)O(CF_2)_2SO_2NNaSO_2(CF_2)_4SO_2NNaSO_2CF_3$, 45 grams of the $CF_3SO_2NNaSO_2(CF_2)_4SO_2NNa\,SiMe_3$ produced as above was transferred to a 500-ml one-neck flask. 200 ml acetonitrile and 41.4 g $CF_2ClCFClOCF_2CF(CF_3)OCF_2CF_2SO_2F$ was then added to the flask under nitrogen atmosphere. The mixture was stirred under reflux at 85° C. under nitrogen atmosphere for 2 days. Acetonitrile and unreacted reactant were removed by high vacuum evaporation. The residue was dried under high vacuum at 80° C. for one day to yield a chlorinated product.

To finally produce the monomer of this example, $CF_2=CFOCF_2CF(CF_3)OCF_2CF_2SO_2NHSO_2(CF_2)_4SO_2NHSO_2CF_3$, 10 g of $CF_2ClCFClOCF_2CF(CF_3)OCF_2CF_2SO_2NNaSO_2(CF_2)_4SO_2NNaSO_2CF_3$, 5 g of activated zinc powder and 50 ml of acetic anhydride were stirred together in a 200-ml flask at 80° C. for 8 hours. After filtration, acetic anhydride was removed by high vacuum evaporation and the solid residue was dried under high vacuum at 90° C. for 12 hours. The residue was acidified with 100 ml of 3M hydrochloric acid. Extraction of the solution with ethyl ether and evaporation of ether from the ether layer yielded crude monomer which was then sublimed at 100° C. for purification.

The reaction mechanism for producing the monomer of this example is as follows:

EXAMPLE 6

As previously explained, the novel monomers of the present invention may be polymerized and copolymerized according to the teachings herein. One exemplary copolymer which is described in this example is the copolymer of $CF_2=CFCF_2OCF_2CF_2SO_2N(Na)SO_2CF_3$ and $C_2F_4$ (TTF). This copolymer is produced by diluting 10 g of $CF_2=CFCF_2OCF_2CF_2SO_2NNaSO_2CF_3$ to 100 ml with distilled water and adding a portion of this solution to a 100-ml beaker. 0.1 g of $NaHSO_3$, 0.1 g of $Na_2S_2O_8$, 0.5 g of $Na_2HPO_4 \times 7H_2O$, and 0.3 g of $C_7F_{15}CO_2Na$ were then added and the mixture was diluted to 40 ml with distilled water. To remove $O_2$ gas in the solution, $N_2$ gas was bubbled through the solution for 5 minutes. The solution was poured into a funnel connected to a 50-ml autoclave which had been evacuated and the solution was drawn into the autoclave. The mixture was stirred at 450 rpm while $C_2F_4$ was added at 75 psi and the rate of the copolymerization was monitored. Once a 80 psi total pressure drop of $C_2F_4$ was achieved in the autoclave, the copolymerization reaction was stopped and the solution was removed from the autoclave and added to a beaker. 20 ml of concentrated hydrochloric acid was added to the beaker and the mixture was left for 12 hours. After filtration, the precipitate was washed with ether and deionized water and dried under high vacuum at 100° C. for one day. The solid was washed with deionized water until the wash water was neutral. The solid was dried under high vacuum at 100° C. for one day. NMR analysis showed that $—[(CF_2CF_2)_nCF_2CF]_x—CF_2OCF_2CF_2SO_2NHSO_2CF_3$ was produced.

EXAMPLE 8

In this example, $CF_2=CFOCF_2CF(CF_3)OCF_2CF_2NNaSO_2(CF_2)_4SO_2NNaSO_2F_3$ was copolymerized with $C_2F_4$. In dry box, $CF_2=CFOCF_2CF(CF_3)OCF_2CF_2SO_2NNaSO_2(CF_2)_4SO_2NNaSO_2CF_3$ was added to a 100-ml beaker. 5 ml of distilled water was added in addition to sufficient $NaHCO_3$ saturated aqueous solution to neutralize the acidic solution. 0.1 g of $NaHSO_3$, 0.1 g of $Na_2S_2O_8$, 0.3 g of $C_7F_{15}CO_2Na$ and 0.5 g of $Na_2HPO_4 \times 7H_2O$ were added to the solution along with distilled water. $N_2$ gas was bubbled through the

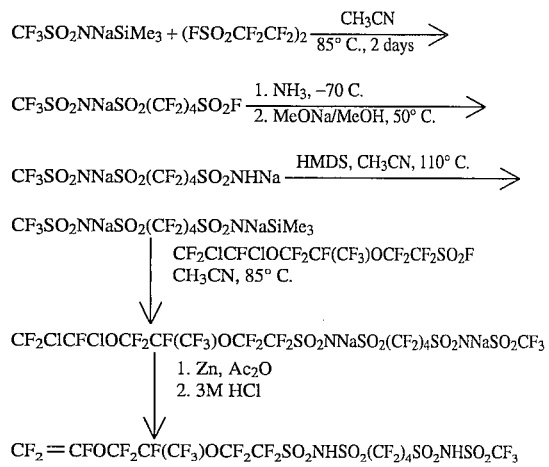

solution for 5 minutes to remove $O_2$ gas. The solution was added through the funnel connected to a 50-ml autoclave which had been evacuated. The mixture was stirred at 450 rpm and 25° C. and $C_2F_4$ was added at 75 psi. After at total pressure drop of 80 psi of $C_2F_4$ in the autoclave was reached, the copolymerization reaction was stopped and $C_2F_4$ gas was vented. 40 ml of ethanol and 20 ml concentrated hydrochloric acid were added to the solution and the mixture stood for 12 hours. After filtration, the precipitate was washed with ether several times and heated under high vacuum at 80° C. for 12 hours. The solid was washed with deionized water until the wash water was neutral. The solid was then dried under high vacuum at 80° C. for one day. NMR analysis showed that

was produced.

EXAMPLE 9

Various other copolymers were produced as described in Examples 9–12 and ionomer membranes made from therefrom were produced as described in Examples 13 and 14. A 40 ml solution of distilled water, 0.3 g of $C_7F_{15}CO_2Na$, 0.1 g of $Na_2S_2O_8$, 0.1 g of $NaHSO_3$, 0.50 g of $Na_2HPO_4 \times 7H_2O$ and 0.55 g of were drawn into a an evacuated autoclave (50 ml volume). The solution was stirred at 30° C. and between 70 and 75 psi pressure of TFE was maintained for 6 hours. 40 ml of ethanol and hydrochloric acid were added with stirring. The precipitated copolymer was washed with ethyl ether and redistilled water and then dried.

EXAMPLE 10

40 ml of distilled water, 0.30 g of $C_7F_{15}CO_2Na$, 0.10 g of $Na_2S_2O_8$, 0.10 g of $NaHSO_3$, 0.50 g of $Na_2HPO_4 \times 7H_2O$ and 1.0 g of $CF_2=CFOCF_2CF(CF_3)OCF_2CF_2SO_2N(Na)SO_2CF_3$ were polymerized in the same manner as in Example 9.

EXAMPLE 11

300 ml of water, 2.1 g of $C_7F_{15}CO_2Na$, 3.5 g of $Na_2HPO_4 \times 7H_2$, 0.7 g of $Na_2S_2O_8$, 0.7 g of $NaHSO_3$ and 5.0 g of $CF_2=CFOCF_2CF(CF_3)OCF_2CF_2SO_2N(Na)SO_2CF_3$ were absorbed into a 450-ml evacuated autoclave. The solution was stirred at 20° C. and between 70 and 75 psi pressure of TFE for 10 hours. 200 ml of ethanol and 150 ml of hydrochloric acid were then added. The precipitated copolymer was washed with ethyl ether and redistilled water and then dried.

EXAMPLE 12

300 ml of water, 2.1 g of $C_7F_{15}CO_2Na$, 3.5 g of $Na_2HPO_4 \times 7H_2$), 0.7 g of $Na_2S_2O_8$, 0.7 g of $NaHSO_3$ and 7.5 g of $CF_2=CFOCF_2CF(CF_3)OCF_2CF_2SO_2N(Na)SO_2CF_3$ were copolymerized with TFE in the same manner as in Example 11.

EXAMPLE 13

2.0 g of the acid form of a copolymer of TFE and $CF_2=CFOCF_2CF(CF_3)OCF_2CF_2SO_2N(Na)SO_2CF_3$ was swelled in 40 ml of DMF. The mixture was blended to form a polymer solution and filtered to remove air bubbles. The polymer solution was poured into a leveled dish and the solvent was evaporated in a vacuum oven at about 90° to 100° C. and 600 mm Hg pressure. An ionomer membrane exhibiting the desired characteristics described hereinabove was formed at the bottom of the dish.

EXAMPLE 14

2.0 g of the acid form of a copolymer of TFE and $CF_2=CFOCF_2CF(CF_3)OCF_2CF_2SO_2N(Na)SO_2CF_3$ was swelled in 40 ml of DMF. The mixture was blended to form a polymer solution. After filtration and removal of air bubbles, the polymer solution was poured into a dish having a Teflon PFA cloth at the bottom. The solvent was evaporated according to the method described in Example 13. A reinforced copolymer electrochemical membrane exhibiting the desired characteristics described hereinabove was formed at the bottom of the dish.

What is claimed is:

1. A copolymer of tetrafluoroethylene and monomer having the general formula:

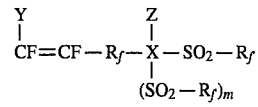

wherein X is C, CH or N, Z is a Group IA element, calcium, magnesium, strontium, or barium, $R_f$ is a perfluoroalkylene group chosen from the group consisting of a perfluoroalkylene, a perfluoroalkylene containing one or more ether groups, a perfluoroalkylene containing one or more sulfonyl groups, and a perfluoroalkylene containing ether and sulfonyl groups, $R_f$ is $C_nF_{2n+1}$ (n=0, 1, 2, . . . 10), Y is $C_nF_{2n+1}$ (n=0, 1, 2, . . .10) and m is 0 or 1.

2. The copolymer of claim 1 wherein said monomer has the formula

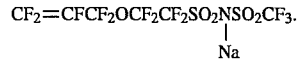

3. The copolymer of claim 1 wherein said monomer has the formula

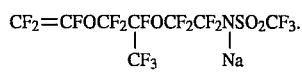

4. The copolymer of claim 1 wherein said monomer has the formula

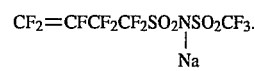

5. A copolymer of tetrafluoroethylene and monomer having the formula

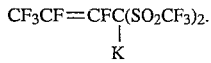

6. A copolymer of tetrafluoroethylene and monomer having the formula

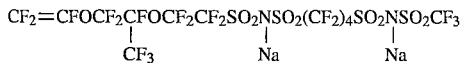

7. A membrane comprising a polymer made from a monomer wherein said monomer has the general formula:

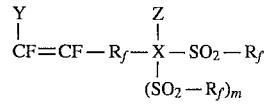

wherein X is C, CH or N, Z is a Group IA element, calcium, magnesium, strontium, or barium, $R_f$ is a perfluoroalkylene group chosen from the group consisting of a perfluoroalkylene, a perfluoroalkylene containing one or more ether groups, a perfluoroalkylene containing one or more sulfonyl groups, and a perfluoroalkylene containing ether and sulfonyl groups, $R_f$ is $C_nF_{2n+1}$ (n=0, 1, 2, ...10), Y is $C_nF_{2n+1}$ (n=0, 1, 2, ...10) and m is 0 or 1.

8. The copolymer of claim 1 wherein Z is a Group IA element.

9. The copolymer of claim 8 wherein Z is H, K, or Na.

10. The copolymer of claim 1 wherein $R_f$ is $C_nF_{2n+1}$ (n=0, 1, or 2).

11. A copolymer of tetrafluoroethylene and monomer having the general formula:

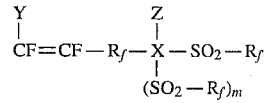

wherein X is C, CH or N, Z is a Group IA element, calcium, magnesium, strontium, or barium, $R_f$ is a perfluoroalkylene group chosen from the group consisting of a perfluoroalkylene, a perfluoroalkylene containing one or more ether groups, a perfluoroalkylene containing one or more sulfonyl groups, and a perfluoroalkylene containing ether and sulfonyl groups, $R_f$ is $C_nF_{2n+1}$ where n is 0 or an integer greater than 0, Y is $C_nF_{2n+1}$ where n is 0 or an integer greater than 0 and m is 0 or 1.

12. A membrane comprising a polymer made from a monomer wherein said monomer has the general formula:

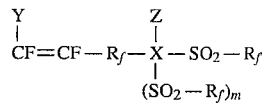

wherein X is C, CH or N, Z is a Group IA element, calcium, magnesium, strontium, or barium, $R_f$ is a perfluoroalkylene group chosen from the group consisting of a perfluoroalkylene, a perfluoroalkylene containing one or more ether groups, a perfluoroalkylene containing one or more sulfonyl groups, and a perfluoroalkylene containing ether and sulfonyl groups, $R_f$ is $C_nF_{3n+1}$ where n is 0 or an integer greater than 0, Y is $C_nF_{2n+1}$ where n is 0 or an integer greater than 0 and m is 0 or 1.

* * * * *